(12) United States Patent
Alkasimi et al.

(10) Patent No.: US 12,518,259 B1
(45) Date of Patent: Jan. 6, 2026

(54) SYSTEMS AND METHODS FOR PAYMENT PROCESSING DURING VEHICULAR TRAVEL

(71) Applicant: AMERICAN AIRLINES, INC., Fort Worth, TX (US)

(72) Inventors: Hyder Alkasimi, Flower Mound, TX (US); Roger Jarboe, Flower Mound, TX (US); Charles Sucur, Southlake, TX (US); Susanna Brown, Dallas, TX (US); Benjamin Chan, McKinney, TX (US); Deviprasad Mulupuri, Irving, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 486 days.

(21) Appl. No.: 17/542,889

(22) Filed: Dec. 6, 2021

Related U.S. Application Data

(63) Continuation of application No. 16/118,957, filed on Aug. 31, 2018, now Pat. No. 11,195,159.

(51) Int. Cl.
*G06Q 20/20* (2012.01)
*B64D 11/00* (2006.01)
*G06Q 20/32* (2012.01)
*G06Q 20/34* (2012.01)

(52) U.S. Cl.
CPC .......... *G06Q 20/204* (2013.01); *B64D 11/00* (2013.01); *G06Q 20/208* (2013.01); *G06Q 20/3278* (2013.01); *G06Q 20/352* (2013.01)

(58) Field of Classification Search
CPC .............. G06Q 20/204; G06Q 20/208; G06Q 20/3278; G06Q 20/352; B64D 11/00
See application file for complete search history.

(56) References Cited

U.S. PATENT DOCUMENTS

| | | | |
|---|---|---|---|
| 8,613,385 B1 * | 12/2013 | Hulet ................. | B64D 11/0015 235/375 |
| 2006/0049247 A1 * | 3/2006 | Al Amri ................... | G07F 7/08 235/382 |
| 2009/0288123 A1 * | 11/2009 | Havlovick ......... | B64D 11/0624 340/963 |

(Continued)

*Primary Examiner* — Florian M Zeender
*Assistant Examiner* — Kimberly S. Bursum
(74) *Attorney, Agent, or Firm* — HAYNES AND BOONE, LLP

(57) ABSTRACT

Systems and methods of retailing a retail item to an airline passenger generally include providing an airplane equipped with: an airplane cabin; a plurality of seats disposed within the airplane cabin and partitioned by an aisle; a service cart movable along the aisle; and a digital reader device; positioning the retail item in the vicinity of the digital reader device; reading an item identifier of the retail item using the digital reader device; storing the item identifier in a reader memory of the digital reader device; positioning a digital payment object in the vicinity of the digital reader device, the digital payment object being carried onto the airplane by the airline passenger; communicating information between the digital payment object and the digital reader device; and processing payment for the retail item. The digital payment object may include a physical passenger identifier, a contactless payment object, or a portable user device.

5 Claims, 12 Drawing Sheets

(56) References Cited

U.S. PATENT DOCUMENTS

| | | | | |
|---|---|---|---|---|
| 2010/0057551 | A1* | 3/2010 | Blaisdell | G06Q 20/387 |
| | | | | 705/14.27 |
| 2010/0070376 | A1* | 3/2010 | Proud | G06Q 50/14 |
| | | | | 705/16 |
| 2012/0226537 | A1* | 9/2012 | Subbarao | G06Q 30/06 |
| | | | | 705/14.23 |
| 2012/0298737 | A1* | 11/2012 | Thakar | B64D 11/0015 |
| | | | | 235/375 |
| 2013/0001987 | A1* | 1/2013 | Heredia | B64D 11/0638 |
| | | | | 297/163 |
| 2014/0201084 | A1* | 7/2014 | Dagenais | G06Q 20/382 |
| | | | | 705/64 |
| 2015/0025921 | A1* | 1/2015 | Smith | G07F 17/0014 |
| | | | | 705/5 |
| 2015/0248660 | A1* | 9/2015 | Muirhead | G06Q 20/3278 |
| | | | | 705/39 |
| 2015/0248661 | A1* | 9/2015 | Pontious | G06Q 30/0185 |
| | | | | 705/16 |
| 2019/0039734 | A1* | 2/2019 | Shah | G09F 21/00 |
| 2021/0342966 | A1* | 11/2021 | Watanabe | G06Q 10/06315 |

* cited by examiner

SYSTEMS AND METHODS FOR PAYMENT PROCESSING DURING VEHICULAR TRAVEL

CROSS-REFERENCE TO RELATED APPLICATION

This application is a continuation of U.S. application Ser. No. 16/118,957, filed Aug. 31, 2018, the entire disclosure of which is hereby incorporated herein by reference.

TECHNICAL FIELD

The present disclosure relates generally to providing goods and services during vehicular travel and, more particularly, to systems and methods for payment processing during vehicular travel.

BACKGROUND

The current prevailing method of inflight sales or retailing involves flight attendants recording each sales item via an Onboard Sales Recorder (OSR) device that requires keyboard/touch actions to perform a physical transaction (e.g., via cash or credit/debit card), which slows down inflight service and impacts airline passenger experience. The disadvantages of the OSR technology traditionally used for inflight sales and payment include the need for flight attendants to record each item via touch, pen, and/or keyboard interaction, and the limited payment forms that can be used with OSR devices. More particularly, in many instances, for each sales item a flight attendant must browse through a menu of sales items and select the appropriate one, which slows down the inflight sales process. Digital Customer Ordering (DCO) is sometimes utilized in an attempt to overcome at least some of the disadvantages of OSR technology, and involves airline passengers ordering inflight sales items from their personal devices or an Inflight Entertainment (IFE) device. However, DCO also has disadvantages, namely requiring airline passengers to carry a smartphone with the corresponding airline application or an IFE installed at the seat with the application loaded, requiring a change in flight service procedures, and requiring airline passengers to perform the sales recording. Therefore, what is needed is one or more apparatus, systems, or methods to address one or more of the foregoing issues, and/or one or more other issues.

DETAILED DESCRIPTION

Figure 1A:
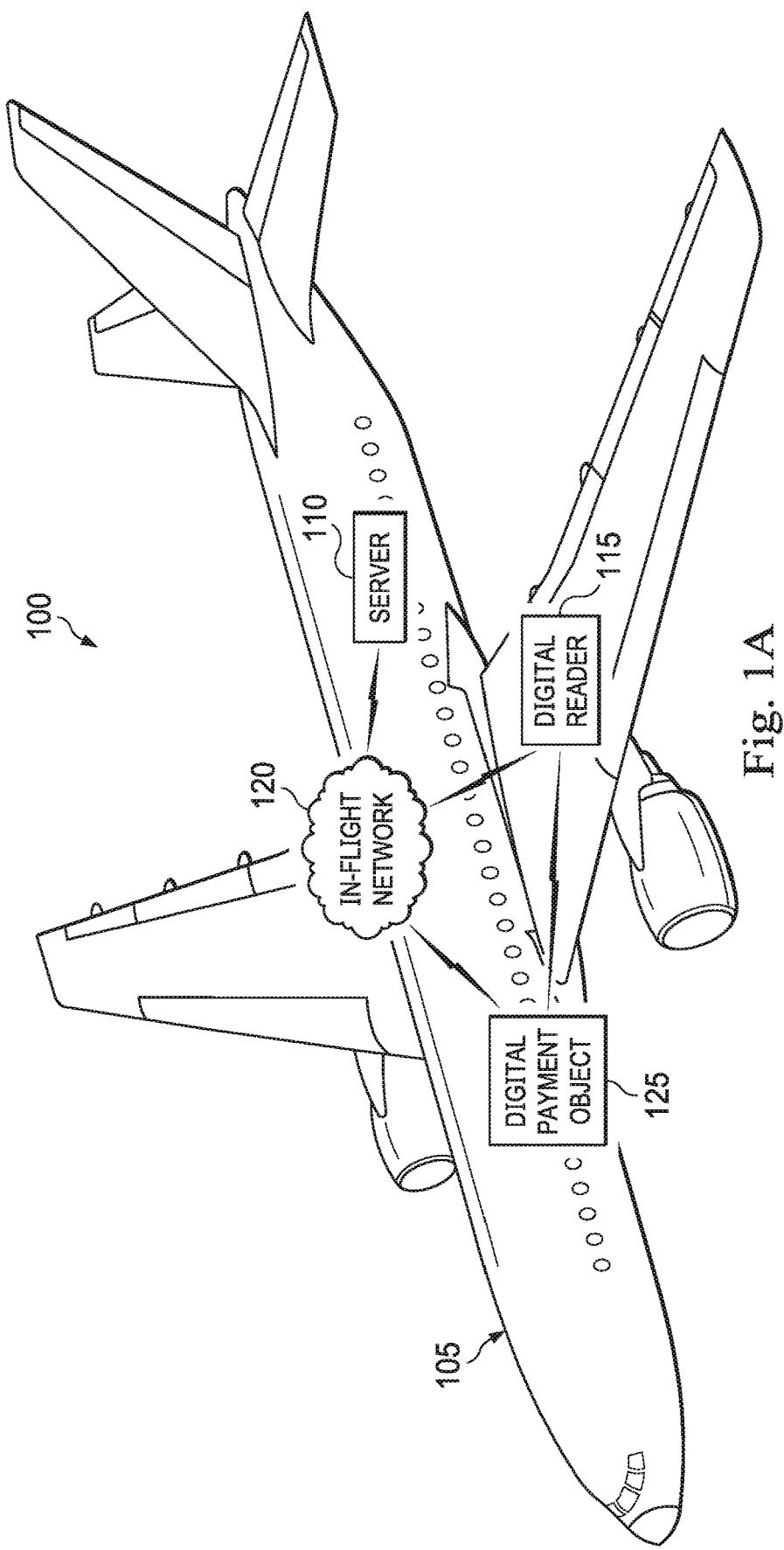
FIG. 1A is a diagrammatic illustration of a system according to one or more embodiments of the present disclosure.

In an embodiment, as illustrated in FIG. 1A, a system is generally referred to by the reference numeral 100 and includes a vehicle, such as an airplane 105, and a computer server 110 located on the airplane 105. In an embodiment, the airplane 105 is operated by a commercial airline. A digital reader device 115 is operably coupled to, and adapted to be in communication with, the computer server 110 via an in-flight network 120. A digital payment object 125 is adapted to communicate with the digital reader device 115. The digital payment object 125 may include, but is not limited to, a portable user device, a physical airline passenger identifier, a contactless payment object, another digital payment object, and/or any combination thereof, as will be described in further detail below. In several embodiments, the digital payment object 125 is adapted to communicate with the digital reader device 115 via near field communication (NFC), Bluetooth, infrared, proximity inference via, for example, Global Positioning System (GPS) or triangulation, or other indirect technologies. In several embodiments, the digital payment object 125 is adapted to communicate with the digital reader device 115 via 802.11b, 802.11g, 802.11a, ultra-wideband (UWB), multiple band rates, or other suitable technologies. The methods and systems described herein facilitate pairing of the digital reader device 115 with various digital payment objects 125 in novel ways to increase flexibility and streamline the sales and payment process.

The digital reader device 115 may be, include, or be part of a physical seatback tray, a service cart, or any other aircraft surface outfitted with the digital reader device 115 and storage technology described herein. For example, the digital reader device 115 may be designed for incorporation into a single physical surface or multiple non-contiguous surfaces. The digital reader device 115 may be configured to leverage technologies including short wave infrared technologies, RFID, object recognition, light or laser scanning, charge coupled devices (CCD), camera technologies, other reader technologies, and/or any combination thereof.

In an embodiment, the in-flight network 120 includes the Internet, one or more local area in-flight networks, one or more wide area in-flight networks, one or more cellular in-flight networks, one or more wireless in-flight networks, one or more voice in-flight networks, one or more data in-flight networks, Ethernet, one or more communication systems, and/or any combination thereof. In several embodiments, the in-flight network 120 includes one or more access points, each of which may be a router, wireless access point, or any other device or module, or a combination thereof, which enables communication between electronic devices, including between the computer server 110 and the digital reader device 115.

Figure 1B:
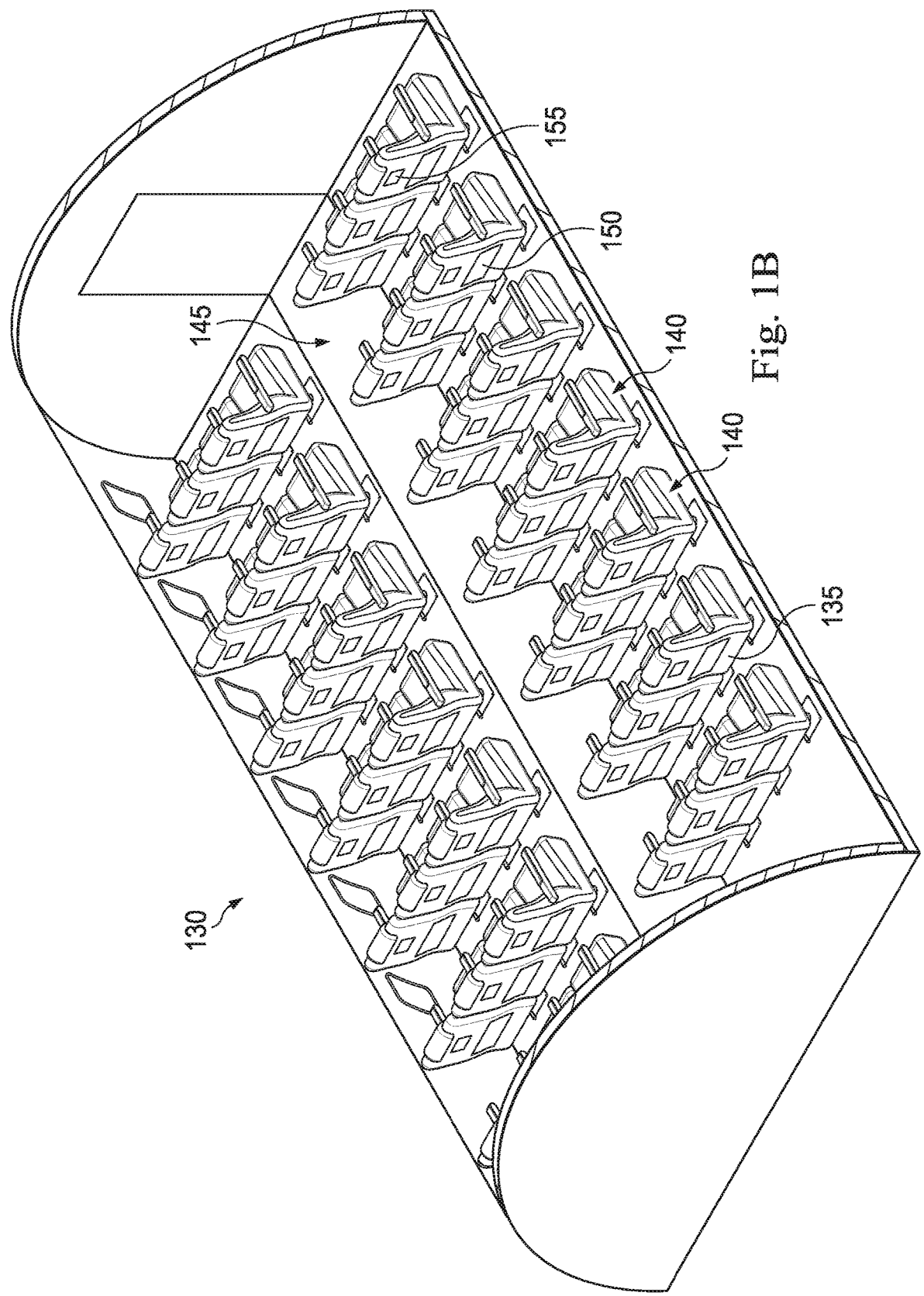
FIG. 1B is a perspective view of an airline cabin of the system of FIG. 1A, according to one or more embodiments of the present disclosure.

In an embodiment, as illustrated in FIG. 1B with continuing reference to FIG. 1A, an airplane cabin is generally referred to by the reference numeral 130. The airplane cabin 130 is part of the airplane 105. A plurality of seats 135 are arranged in seat rows 140 in the airplane cabin 130. An aisle 145 extends longitudinally through the airplane cabin 130 and partitions the seat rows 140. In several embodiments, the seats 135 are substantially identical to each other. The seats 135 each include a seatback tray 150 that can be folded down for the convenience of the airline passenger in the seat 135 immediately behind the seat 135 of which the seatback tray 150 is a part. In several embodiments, the seats 135 also each include an inflight entertainment (IFE) device 155. A service cart 160 (shown in FIG. 1C) is movable along the aisle 145 by the flight attendants to distribute service and/or retail items to the airline passengers. The airplane cabin 130 may also include other components such as, for example, sidewalls, a ceiling, overhead storage bins, partitions, lavatories, a service preparation area, emergency exits, other components, and/or any combination thereof.

Figure 1C:
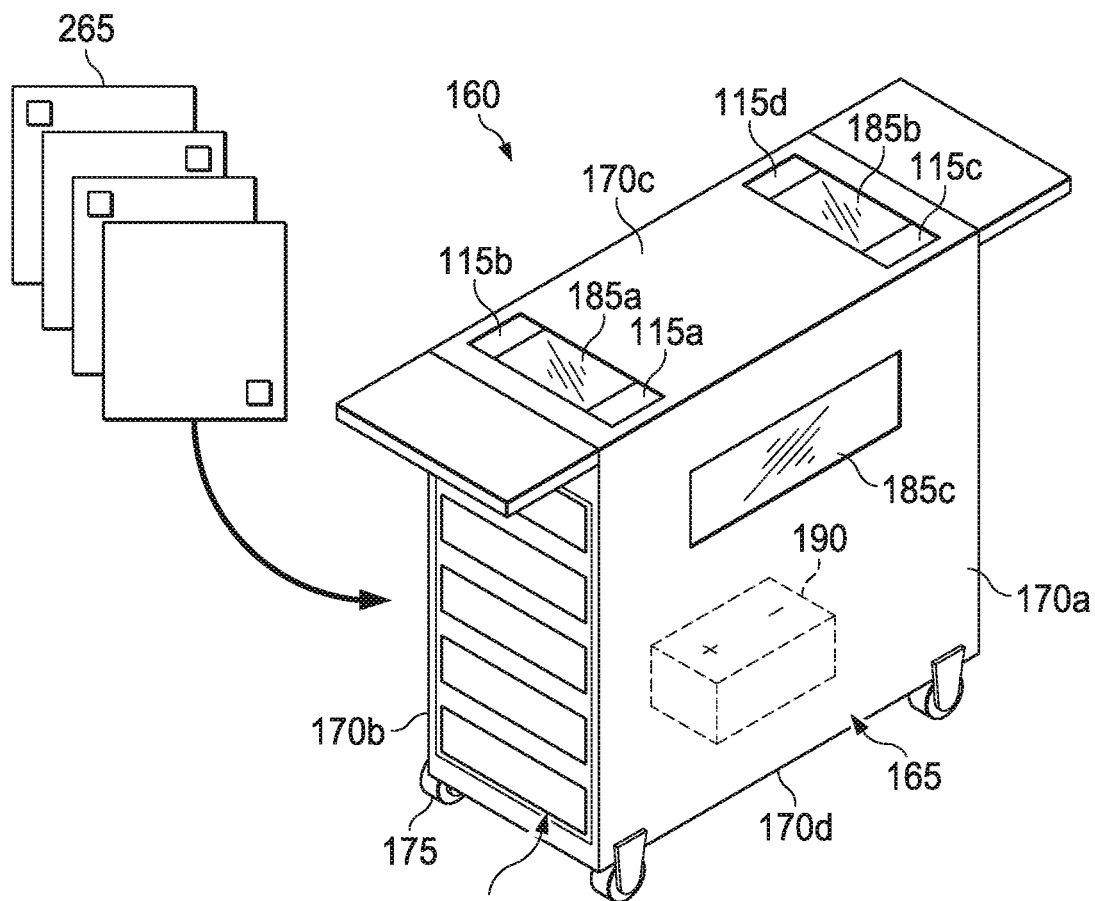
FIG. 1C is a perspective view of a service cart movable along an aisle of the airline cabin of FIG. 1B, according to one or more embodiments of the present disclosure.

In an embodiment, as illustrated in FIG. 1C with continuing reference to FIGS. 1A and 1B, the service cart 160 includes a body 165 including a first side portion 170a, a second side portion 170b, a top portion 170c, and a bottom portion 170d. In several embodiments, the first side portion 170a, the second side portion 170b, the top portion 170c, and the bottom portion 170d are formed from individual panels that are fastened together to form the body 165. In other embodiments, the first side portion 170a, the second side portion 170b, the top portion 170c, and the bottom portion 170d are integrally formed as a single component. A plurality of rollers 175 are coupled to the bottom portion 170d of the body 165 to permit movement of the service cart 160 along the aisle 145 by the flight attendant(s). The body 165 defines an interior region 180, which can house a plurality of horizontal supports configured to support trays of service and/or retail items (e.g., food, beverages, meal trays, etc.) for distribution to the airline passengers. The service cart 160 is configured so that flight attendants can conveniently access the interior portion 180 of the body 165 from either end of the service cart 160 when the service cart 160 is moved along the aisle 145 to distribute service and/or retail items to the airline passengers.

In several embodiments, the digital reader device 115 may be, include, or be part of, a plurality of digital reader devices 115a-e, as will be discussed in further detail below; thus, as used herein the reference numeral 115 (without the suffixes a, b, c, d, or e) may refer to one, or a combination, of the digital reader devices 115a-e. Similarly, a plurality of display units 185a-e are discussed in further detail below; thus as used herein the reference numeral 185 (without the suffixed a, b, c, d, or e) may refer to one, or a combination, of the display units 185a-e.

In several embodiments, one or more digital reader devices 115a-d are coupled to the top portion 170c of the body 165 of the service cart 160. In several embodiments, one or more display units 185a-b are coupled to the top portion 170c of the body 165 of the service cart 160. In several embodiments, the display unit 185a and the digital reader devices 115a-b are positioned at one end of the service cart 160, while the display unit 185b and the digital reader devices 115c-d are positioned at the other end of the service cart 160. The display unit 185a is positioned between the digital reader devices 115a-b, which digital reader devices 115a-b are positioned proximate the side portions 170a and 170b, respectively, of the service cart 160. The display unit 185b is positioned between the digital reader devices 115c-d, which digital reader devices 115c-d are positioned proximate the side portions 170a and 170b, respectively, of the service cart 160. Additionally, in several embodiments, a display unit 185c is coupled to the side portion 170a of the body 165 of the service cart 160. Although not visible in FIG. 1C, an additional display unit substantially identical to the display unit 185c is also coupled to the side portion 170b of the body 165 of the service cart 160. In several embodiments, the display units 185c-d and the additional display unit are conveniently visible by the airline passengers seated in the plurality of seats 135 when the service cart 160 is moved along the aisle 145 adjacent the airline passengers' particular seat row 140. A service cart electrical power supply 190 is housed in the service cart 160. The service cart electrical power supply 190 is electrically coupled to the digital reader devices 115a-d, as well as the display units 185a-d, to provide electrical power thereto.

Figure 1D:
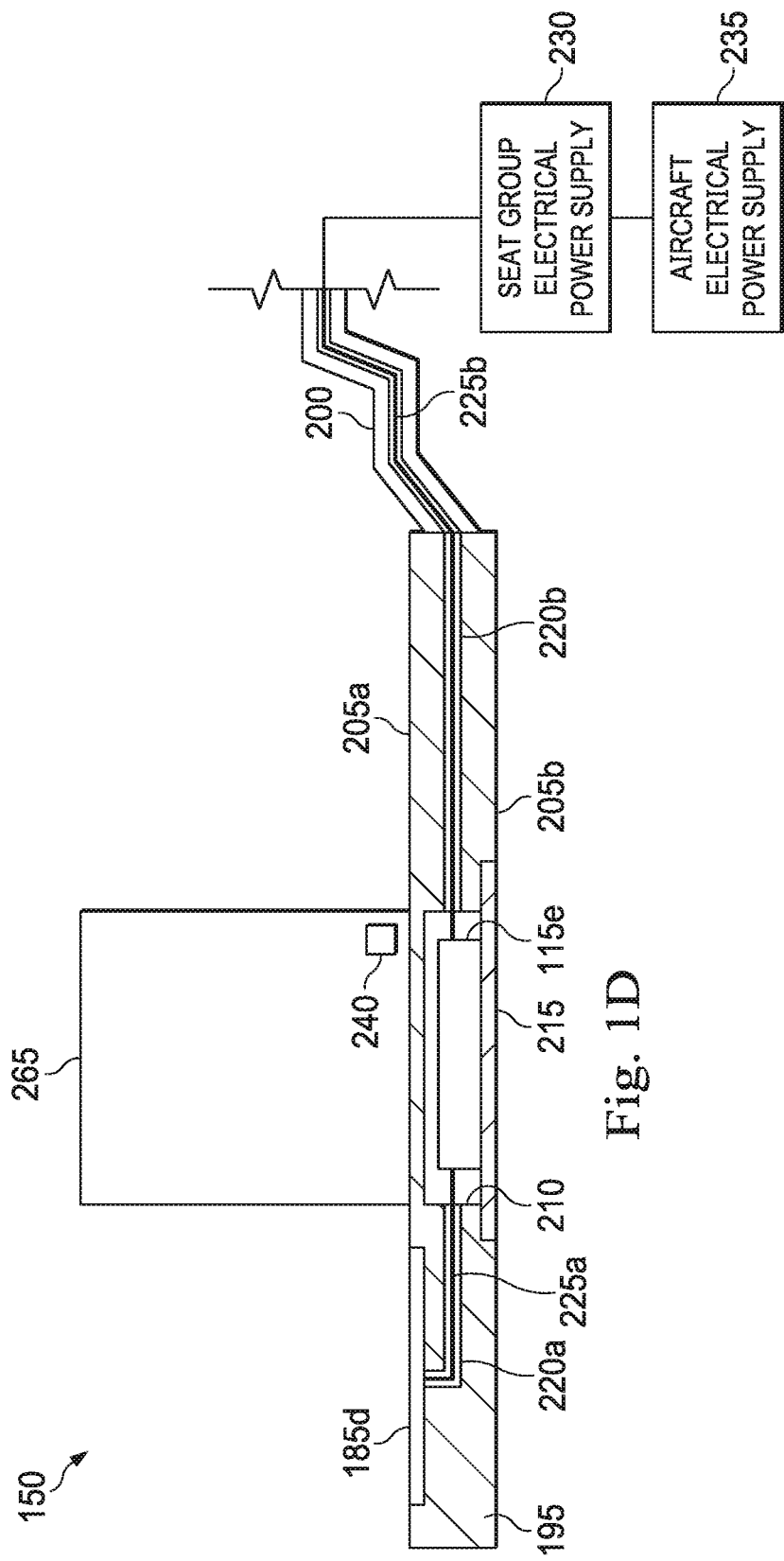
FIG. 1D is a cross-sectional view of a seatback tray of one of a plurality of seats disposed within the airline cabin of FIG. 1B, according to one or more embodiments of the present disclosure.

In an embodiment, as illustrated in FIG. 1D with continuing reference to FIGS. 1A, 1B, and 1C, the seatback tray 150 includes a body 195 and mounting brackets 200, one of which is shown in FIG. 1D. The body 195 includes a topside 205a and an underside 205b. The body 195 is pivotably coupled to the seat 135 at opposing lateral sides thereof via the mounting brackets 200. The body 195 is movable between a stowed position (see the seatback tray 150 in FIG. 1B) and a lowered use position, which is shown in FIG. 1D. A latch (not shown) is configured to secure the body 195 in its stowed position. A recess 210 is formed into the body 195 of the seatback tray 150. In the embodiment of FIG. 1D, the recess 210 is formed into the body 195 on the underside 205b of the seatback tray 150. However, in some embodiments the recess 210 may instead be formed into the body 195 on the topside 205a of the seatback tray 150. A digital reader device 115e is coupled to the body 195; in the embodiment illustrated in FIG. 1D, the digital reader device 115e is coupled to the body 195 by being secured within the recess 210 by a cover plate 215. A display unit 185d is connected to the topside 205a of the body 195 of the seatback tray 150. In several embodiments, the display unit 185d is recessed into the body 195 so as to be substantially flush with the topside 205a of the seatback tray 150. In several embodiments, a wireway 220a extends through the body 195 from the display unit 185d to the recess 210. The display unit 185d is connected to, and in communication with, the digital reader device 115e via one or more conductors 225a, which are disposed within the wireway 220a. Alternatively, in several embodiments, the display unit 185d communicates wirelessly with the digital reader device 115e. A wireway 220b extends from the recess 210, and through the body 195 and one of the mounting brackets 200. One or more conductors 225b are disposed within the wireway 220b to electrically couple the digital reader device 115e to a seat group electrical power supply 230. In several embodiments, the one or more conductors 225a are also disposed within the wireway 220b to electrically couple the display unit 185d to the seat group electrical power supply 230. The seat group electrical power supply 230 is electrically coupled to an aircraft electrical power supply 235 to thereby provide electrical power to the digital reader device 115e and the display unit 185d. The seat group electrical power supply 230 and the aircraft electrical power supply 235 are part of the airplane 105. The digital reader device 115e is configured to read an item identifier of a service and/or retail item placed in the vicinity of the topside 205a of the seatback tray 150, as will be described in further detail below.

Figure 2A:
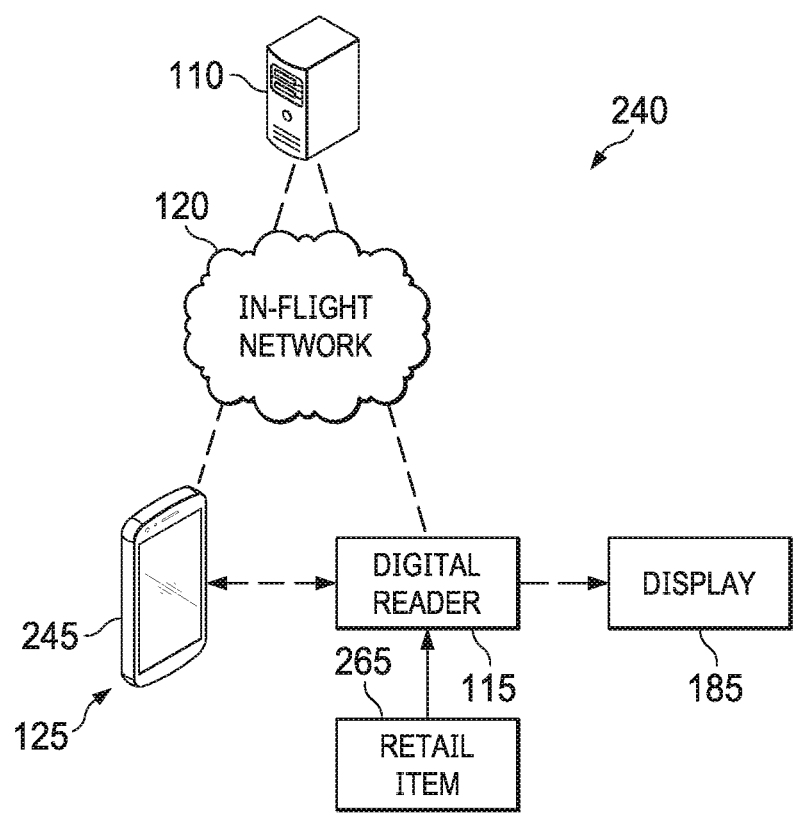
FIG. 2A is a diagrammatic illustration of a system according to one or more embodiments of the present disclosure.

In an embodiment, as illustrated in FIG. 2A, a system is generally referred to by the reference numeral 240 and includes the components of the system 100, which components are given the same reference numerals. Although not shown in FIG. 2A, the system 240 includes the airplane 105, in which the remainder of the components of the system 240 are located or positioned either permanently or temporarily. In the embodiment shown in FIG. 2A, the digital payment object 125 is in the form of a portable user device 245, which device may be operably coupled to, and in communication with, the computer server 110 via the in-flight network 120. In an embodiment, the portable user device 245 is a handheld or otherwise portable user device which is carried onto the airplane 105 by a user who is a passenger on the airplane 105. In another embodiment, the portable user device 245 may be supplied by the operator of the airplane 105. In an additional embodiment, the portable user device 245 may be removably connectable to the airplane 105, such as by temporarily attaching the portable user device 245 to one of the seats 135 or one of the seatback trays 150 in the airplane 105. In a further embodiment, the portable user device 245 may be permanently installed in the airplane 105. In an embodiment, the portable user device 245 may be, include, or be part of, one or more computing devices such as personal computers, personal digital assistants, cellular devices, mobile telephones, wireless devices, handheld devices, laptops, audio devices, tablet computers, game consoles, cameras, and/or any other suitable devices. In several embodiments, the portable user device 245 is a smartphone such as, for example, an iPhone® by Apple Inc.

Figure 2B:
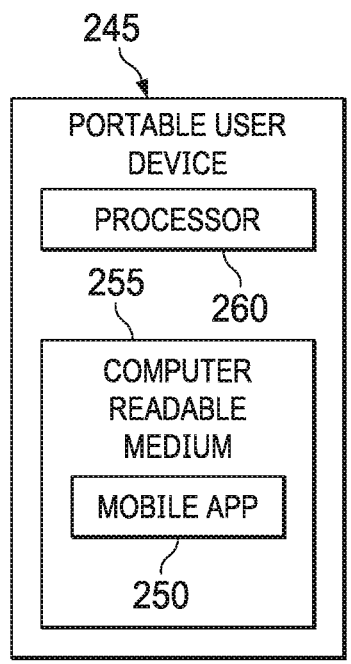
FIG. 2B is a diagrammatic illustration of a portable user device associated with the system of FIG. 2A, according to one or more embodiments of the present disclosure.

A mobile application (or "app") 250 may be stored on the portable user device 245, as shown in FIG. 2B. In several embodiments, the portable user device 245 includes a computer readable medium 255 in which the mobile application 250 is stored, and a processor 260 that executes the mobile application 250. The digital reader device 115 is adapted to communicate with the portable user device 245, as well as a retail item 265 that includes an item identifier 270 (shown in FIG. 2C). The item identifier 270 of the retail item 265 corresponds to the particular digital reader technology employed such as, for example, an RFID passive tag, a color coded tag, a bar code, the object itself, another reader compatible identifier, and/or any combination thereof. The digital reader device 115 and/or the display unit 185 may also be operably coupled to, and in communication with, the computer server 110 via the in-flight network 120. In an embodiment, the digital reader device 115 is NFC-enabled. In several embodiments, the portable user device 245 is adapted to communicate with the digital reader device 115 via near field communication (NFC), Bluetooth, infrared, proximity inference via, for example, Global Positioning System (GPS) or triangulation, or other indirect technologies. In an embodiment, the retail item 265 is a bag of snack food, and the item identifier 270 is a barcode located on the bag.

Figure 2C:
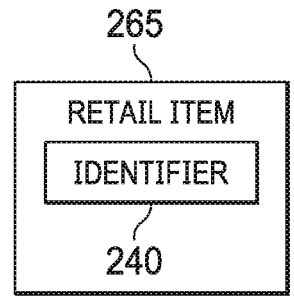
FIG. 2C is a diagrammatic illustration of a retail item associated with the system of FIG. 2A, according to one or more embodiments of the present disclosure.
Figure 2E:
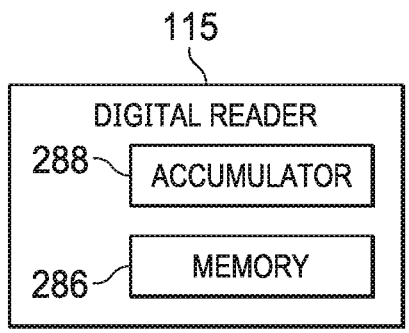
FIG. 2E is a diagrammatic illustration of a digital reader associated with the system of FIG. 2A, according to one or more embodiments of the present disclosure.
Figure 2D:
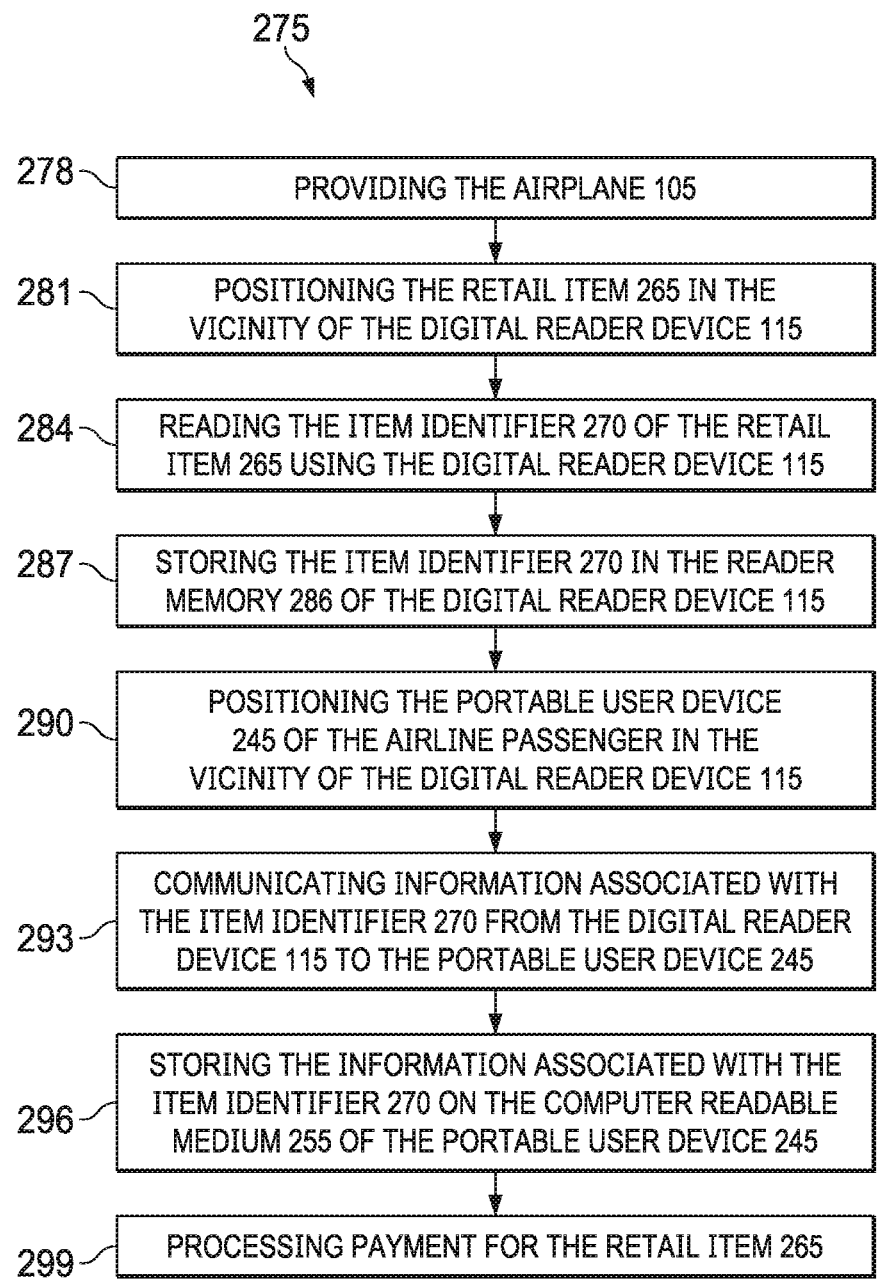
FIG. 2D is a flow chart illustration of a method of operating the system of FIG. 2A, according to one or more embodiments of the present disclosure.

In an embodiment, as illustrated in FIG. 2D with continuing reference to FIGS. 2A, 2B, and 2C, a method of operating the system 240 to sell or retail the retail item 265 to an airline passenger and optimize an inflight sales and payment process is generally referred to by the reference numeral 275. The method 275 is carried out in response to an airline passenger's desire to purchase the retail item 265. The method 275 includes at step 278 providing the airplane 105 equipped with: the airplane cabin 130; the plurality of seats 135 disposed within the airplane cabin 130 and partitioned by the aisle 145; the service cart 160 movable along the aisle 145; and the digital reader device 115 incorporated into either the airplane cabin 130, the service cart 160, or one of the plurality of seats 135. At step 281 the retail item 265 is positioned in the vicinity of the digital reader device 115. In several embodiments, a flight attendant positions the retail item 265 in the vicinity of the digital reader device 115. At step 284 the item identifier 270 of the retail item 265 is read using the digital reader device 115. At step 287 the item identifier 270 is stored in a reader memory 286 (shown in FIG. 2E) of the digital reader device 115. In several embodiments, the digital reader device 115 incorporates an accumulator 288 (shown in FIG. 2E), which is configured to add the price of the retail item 265 to price(s) associated with any previously read item identifiers (e.g., corresponding to other retail items).

At step 290 the digital payment object 125 is positioned in the vicinity of the digital reader device 115, wherein the digital payment object 125 is carried onto the airplane 105 by the airline passenger, and wherein the digital payment object 125 includes the portable user device 245 of the airline passenger. In several embodiments, the airline passenger positions the digital payment object 125 in the vicinity of the digital reader device 115. At step 293 information associated with the item identifier 270 is communicated from the digital reader device 115 to the portable user device 245.

At step 296 the information associated with the item identifier 270 is stored on the computer readable medium 255 of the portable user device 245.

At step 299 payment is processed for the retail item 265. In several embodiments, the step 299 of processing payment for the retail item 265 includes: retrieving the information associated with the item identifier 270 from the computer readable medium 255 of the portable user device 245; and completing payment processing on the mobile application 250 of the portable user device 245 by: using payment information on file with the airline passenger in the mobile application 250; or electronically invoicing the airline passenger. In several embodiments, the mobile application 250 receives order details from the digital reader device 115 and processes the transaction and payment. In several embodiments, the airline passenger uses the mobile application 250 on the portable user device 245 to pay for the retail item 265. The processing of the payment transaction by the mobile application 250 on the portable user device 245 may occur either online or offline. In several embodiments, the payment information on the mobile application 250 may include, but is not limited to, a credit/debit card on file, PayPal, a manually entered credit/debit card, a loyalty account, a cryptocurrency, other payment information, and/or any combination thereof.

In several embodiments, referring back to FIG. 1D with continuing reference to FIGS. 2A-2D, to execute the method 275, at the step 281 the retail item 265 is placed either on or near the topside 205a of the body 195 of the seatback tray 150; the retail item 265 is so placed by either the flight attendant or the airline passenger sitting in the seat associated with the seatback tray 150. At the step 284 the item identifier 270 is read using the digital reader device 115e secured within the recess 210 by the cover plate 215. At the step 290 the airline passenger positions his or her portable user device 245, such as a smartphone, in the vicinity of the digital reader device 115e, and at step 293 information associated with the item identifier 279 is communicated from the digital reader device 115e to the portable user device 245. In several embodiments, the display unit 185d displays information confirming that the step 284, the step 287, the step 293, the step 296, the step 299, or any combination thereof, has or have been completed, thereby providing visual confirmation to the airline passenger and the flight attendant of the successful retailing of the retail item 265 to the airline passenger; in several embodiments, the display unit 185a (shown in FIG. 1C) of the service cart 160, the display unit 185b (shown in FIG. 1C) of the service cart 160, the display unit 185c (shown in FIG. 1C) of the service cart 160, the additional display unit of the service cart 160 opposite the display unit 185c, or any combination thereof, display(s) information that is the same as, or at least similar to, the information displayed on the display unit 185d of the seatback tray 150, thereby providing visual confirmation to the airline passenger (e.g., via the display unit 185c) and the flight attendant (e.g., via the display unit 185a or 185b) of the successful retailing of the retail item 265 to the airline passenger. In several embodiments, the display unit 185a, the display unit 185b, the display unit 185c, the additional display unit opposite the display unit 185c, or any combination thereof, display(s) information that is the same as, or at least similar to, the information displayed on the display unit 185d on the seatback tray 150 in response to communication(s) from the digital reader device 115e to the display unit 185a, the display unit 185b, the display unit 185c, the additional display unit opposite the display unit 185c, or any combination thereof, via the network 120, the portable user device 245, the computer server 110, or any combination thereof.

In several embodiments, referring back to FIG. 1C with continuing reference to FIGS. 2A-2D, to execute the method 275, at the step 281 the retail item 265 is placed either on or near the top portion 170c of the service cart 160 in the vicinity of the digital reader device 115a, 115b, 115c, or 115d; the retail item 265 is so placed by either the flight attendant or the airline passenger. At the step 284 the item identifier 270 is read using the digital reader device 115a, 115b, 115c, or 115d. At the step 290 either the airline passenger or the flight attendant positions the airline passenger's portable user device 245, such as a smartphone, in the vicinity of the digital reader device 115a, 115b, 115c, or 115d, and at step 293 information associated with the item identifier 279 is communicated from the digital reader device 115a, 115b, 115c, or 115d to the portable user device 245. In several embodiments, the display unit 185a, the display unit 185b, the display unit 185c, the additional display unit opposite the display unit 185c, or any combination thereof, displays information confirming that the step 284, the step 287, the step 293, the step 296, the step 299, or any combination thereof, has or have been completed, thereby providing visual confirmation to the airline passenger and the flight attendant of the successful retailing of the retail item 265 to the airline passenger—in one embodiment, such a display of information on the display unit 185c (or the additional display unit opposite the display unit 185c) provides visual confirmation to the seated airline passenger, and such a display of information on the display unit 185a or 185b provides visual confirmation to the standing flight attendant; in several embodiments, the display unit 185d of the seatback tray 150 (shown in FIG. 1D) displays information that is the same as, or at least similar to, the information displayed on the display unit 185a, the display unit 185b, the display unit 185c, the additional display unit opposite the display unit 185c, or any combination thereof, thereby providing visual confirmation to the airline passenger of the successful retailing of the retail item 265 to the airline passenger. In several embodiments, the display unit 185d displays information that is the same as, or at least similar to, the information displayed on the display unit 185a, the display unit 185b, the display unit 185c, the additional display unit opposite the display unit 185c, or any combination thereof, in response to communication from the digital reader device 115a, 115b, 115c, or 115d to the display unit 185d via the network 120, the portable user device 245, the computer server 110, or any combination thereof.

In several embodiments, the operation of the system 240, or the execution of the method 275, occurs before, during or after the airplane 105 has traveled from a departure location to an arrival location, thereby completing a travel leg or airline flight. In several embodiments, the operation of the system 240 or the execution of the method 275 optimizes the sales process and improves the airline passenger experience by, among other things, significantly improving flight service efficiency, giving airline passengers new and flexible payment form(s) (e.g., via the portable user device 245), lowering transaction costs, eliminating the need for current OSR device(s) and associated costs, eliminating the time spent by flight attendant(s) entering each sales item into an OSR via touch, pen, and/or keyboard interface, and eliminating the possibility of user errors that might otherwise occur during the OSR item recording process.

Figure 3A:
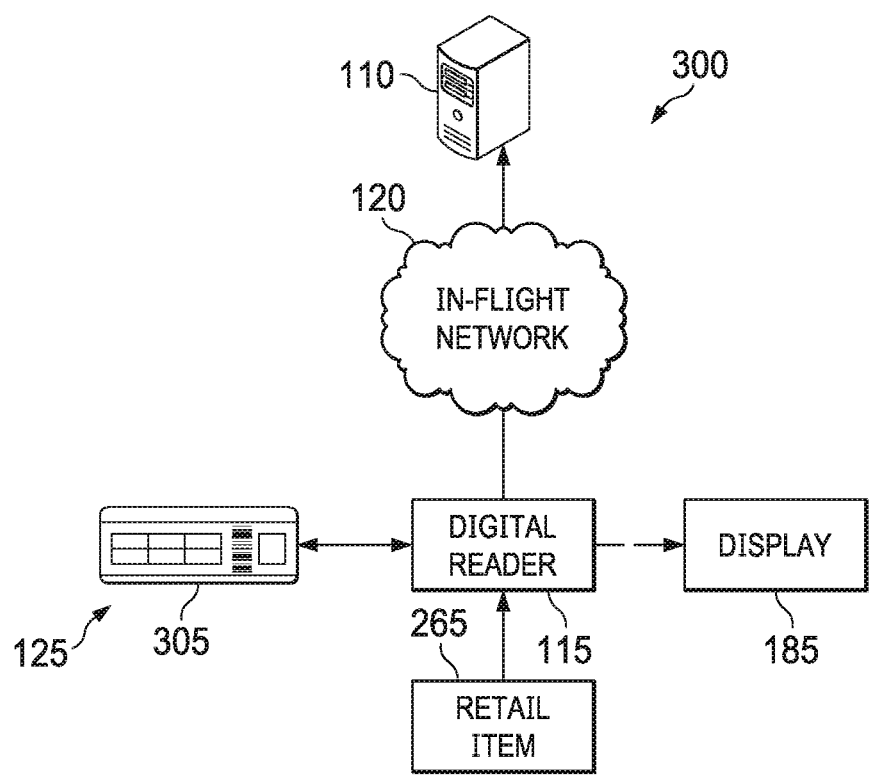
FIG. 3A is a diagrammatic illustration of a system according to one or more embodiments of the present disclosure.

In an embodiment, as illustrated in FIG. 3A, a system is generally referred to by the reference numeral 300 and includes the components of the system 100, which components are given the same reference numerals. Although not shown in FIG. 3A, the system 300 includes the airplane 105, in which the remainder of the components of the system 300 are located or positioned either permanently or temporarily. In the embodiment shown in FIG. 3A, the digital payment object 125 is in the form of a physical passenger identifier 305 such as, for example, a boarding pass. The digital reader device 115 is adapted to communicate with the physical passenger identifier 305, as well as the retail item 265 that includes the item identifier 270 (shown in FIG. 2C). The digital reader device 115 is also operably coupled to, and in communication with, the computer server 110 via the in-flight network 120. As described above, the digital reader device 115 may also be operably coupled to, and in communication with, the display unit 185. In several embodiments, the physical passenger identifier 305 is adapted to communicate with the digital reader device 115 via near field communication (NFC), Bluetooth, infrared, proximity inference via, for example, Global Positioning System (GPS) or triangulation, or other indirect technologies.

Figure 3B:
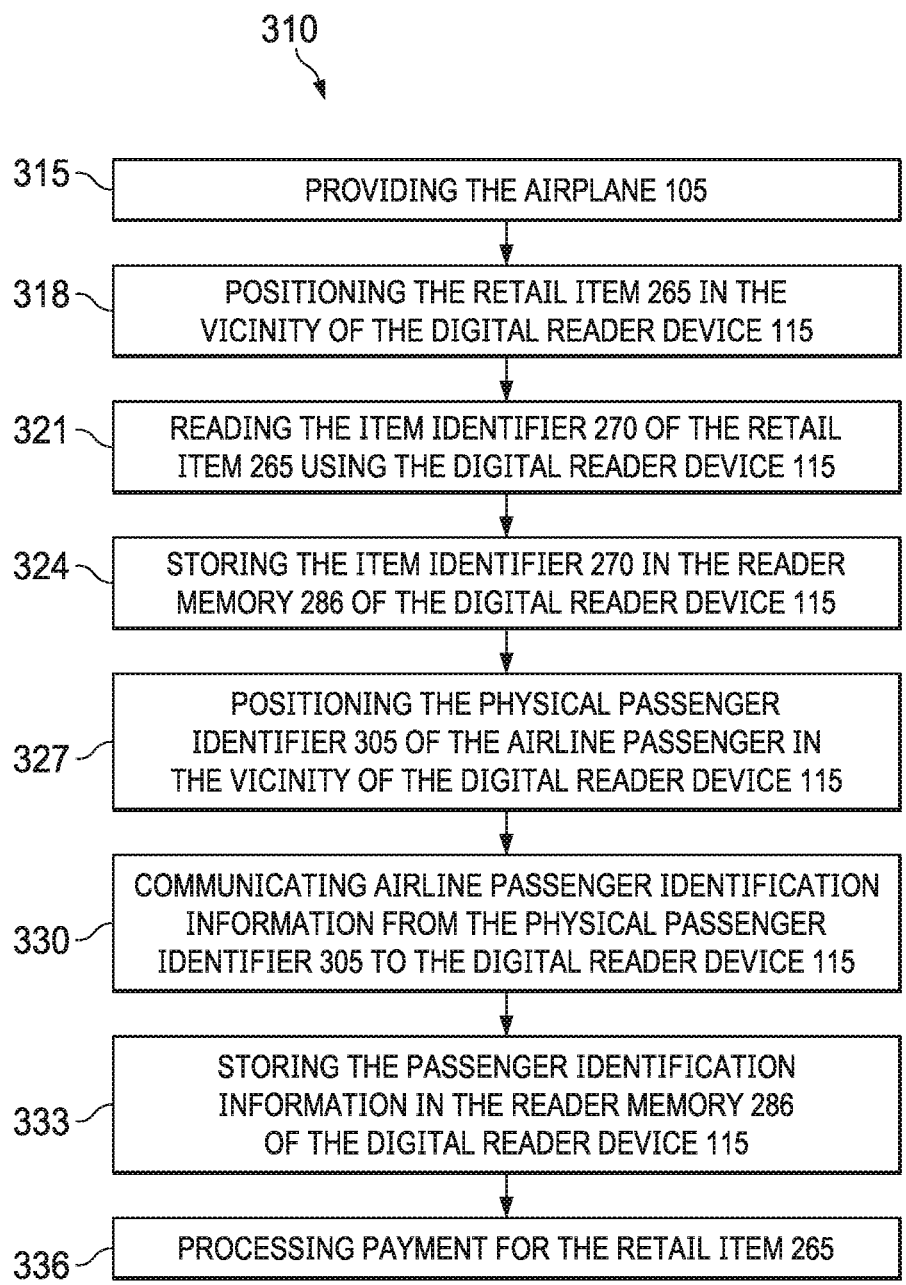
FIG. 3B is a flow chart illustration of a method of operating the system of FIG. 3A, according to one or more embodiments of the present disclosure.

In an embodiment, as illustrated in FIG. 3B with continuing reference to FIG. 3A, a method of operating the system 300 to sell or retail the retail item 265 to an airline passenger and to optimize an inflight sales and payment process is generally referred to by the reference numeral 310. The method 310 is carried out in response to an airline passenger's desire to purchase the retail item 265. The method 310 includes at step 315 providing the airplane 105 equipped with: the airplane cabin 130; the plurality of seats 135 disposed within the airplane cabin 130 and partitioned by the aisle 145; the service cart 160 movable along the aisle 145; and the digital reader device 115 incorporated into either the airplane cabin 130, the service cart 160, or one of the plurality of seats 135. At step 318 the retail item 265 is positioned in the vicinity of the digital reader device 115. In several embodiments, a flight attendant positions the retail item 265 in the vicinity of the digital reader device 115. At step 321 the item identifier 270 of the retail item 265 is read using the digital reader device 115. At step 324 the item identifier 270 is stored in the reader memory 286 of the digital reader device 115. As described above, in several embodiments, the digital reader device 115 incorporates the accumulator 288 (shown in FIG. 2E), which is configured to add the price of the retail item 265 to price(s) associated with any previously read item identifiers (e.g., corresponding to other retail items).

At step 327 the digital payment object 125 is positioned in the vicinity of the digital reader device 115, wherein the digital payment object 125 is carried onto the airplane 105 by the airline passenger, and wherein the digital payment object 125 includes the physical passenger identifier 305 of the airline passenger. In several embodiments, the airline passenger positions the physical passenger identifier 305 in the vicinity of the digital reader device 115. In several embodiments, the physical passenger identifier 305 is a boarding pass with a passive chip incorporated therein. However, the physical passenger identifier 305 may be in another form such as, for example, a driver's license, a passport, an airline loyalty card, a fingerprint of the airline passenger, a voice of the airline passenger, a physical appearance of the airline passenger, yet another form, or any combination thereof. At step 330 airline passenger identification information is communicated from the physical passenger identifier 305 to the digital reader device 115. In several embodiments, the digital reader device 115 reads the physical passenger identifier 305, which serves to identify the airline passenger and provide payment consent. At step 333 the passenger identification information is stored in the reader memory 286 of the digital reader device 115.

At step 336 payment is processed for the retail item 265. In several embodiments, the airplane 105 is further equipped with the computer server 110 and the in-flight network 120; and the step 336 of processing payment for the retail item 265 includes: retrieving the item identifier 270 and the airline passenger identification information from the reader memory 286 of the digital reader device 115; communicating information associated with the item identifier 270 and the airline passenger identification information from the digital reader device 115 to the computer server 110 via the in-flight network 120; and completing payment processing on the computer server 110 by: using payment information on file with the airline passenger in the computer server 110; or electronically invoicing the airline passenger. The payment information may include, but is not limited to, a credit/debit card on file, PayPal, a manually entered credit/debit card, a loyalty account, a cryptocurrency, other payment information, and/or any combination thereof.

In several embodiments, processing of the payment transaction at the step 336 includes displaying order details on the display unit 185 coupled to, and in communication with, the digital reader device 115. In several embodiments, order details may be transmitted for processing from the digital reader device 115 via an alternative wireless network such as, for example, a cellular data network. In several alternative embodiments, processing of the payment transaction occurs in the following manner: the flight attendant uses a digital collection device (not shown) to read order details from the memory 286 of the digital reader device 115 and complete processing of the payment transaction.

In several embodiments, referring back to FIG. 1D with continuing reference to FIGS. 3A-3B, to execute the method 310, at the step 318 the retail item 265 is placed either on or near the topside 205a of the body 195 of the seatback tray 150; the retail item 265 is so placed by either the flight attendant or the airline passenger sitting in the seat associated with the seatback tray 150. At the step 321 the item identifier 270 is read using the digital reader device 115e secured within the recess 210 by the cover plate 215. At the step 327 the airline passenger positions his or her physical passenger identifier 305, such as a boarding pass, in the vicinity of the digital reader device 115e, and at step 330 physical passenger identification information is communicated from the physical passenger identifier 305 to the digital reader device 115e. In several embodiments, the display unit 185d displays information confirming that the step 318, the step 321, the step 327, the step 330, the step 336, or any combination thereof, has or have been completed, thereby providing visual confirmation to the airline passenger and the flight attendant of the successful retailing of the retail item 265 to the airline passenger; in several embodiments, the display unit 185a (shown in FIG. 1C) of the service cart 160, the display unit 185b (shown in FIG. 1C) of the service cart 160, the display unit 185c (shown in FIG. 1C) of the service cart 160, the additional display unit of the service cart 160 opposite the display unit 185c, or any combination thereof, display(s) information that is the same as, or at least similar to, the information displayed on the display unit 185d of the seatback tray 150, thereby providing visual confirmation to the airline passenger (e.g., via the display unit 185c) and the flight attendant (e.g., via the display unit 185a or 185b) of the successful retailing of the retail item 265 to the airline passenger. In several embodiments, the display unit 185a, the display unit 185b, the display unit 185c, the additional display unit opposite the display unit 185c, or any combination thereof, display(s) information that is the same as, or at least similar to, the information displayed on the display unit 185d of the seatback tray 150 in response to communication(s) from the digital reader device 115e to the display unit 185a, the display unit 185b, the display unit 185c, the additional display unit opposite the display unit 185c, or any combination thereof, via the network 120, the physical passenger identifier 305, the computer server 110, or any combination thereof.

In several embodiments, referring back to FIG. 1C with continuing reference to FIGS. 3A-3B, to execute the method 310, at the step 318 the retail item 265 is placed either on or near the top portion 170c of the service cart 160 in the vicinity of the digital reader device 115a, 115b, 115c, or 115d; the retail item 265 is so placed by either the flight attendant or the airline passenger. At the step 321 the item identifier 270 is read using the digital reader device 115a, 115b, 115c, or 115d. At the step 327 either the airline passenger or the flight attendant positions the airline passenger's physical passenger identifier 305, such as a boarding pass, in the vicinity of the digital reader device 115a, 115b, 115c, or 115d, and at step 330 physical passenger identification information is communicated from the physical passenger identifier 305 to the digital reader device 115a, 115b, 115c, or 115d. In several embodiments, the display unit 185a, the display unit 185b, the display unit 185c, the additional display unit opposite the display unit 185c, or any combination thereof, displays information confirming that the step 318, the step 321, the step 327, the step 330, the step 336, or any combination thereof, has or have been completed, thereby providing visual confirmation to the airline passenger and the flight attendant of the successful retailing of the retail item 265 to the airline passenger—in one embodiment, such a display of information on the display unit 185c (or the additional display unit opposite the display unit 185c) provides visual confirmation to the seated airline passenger, and such a display of information on the display unit 185a or 185b provides visual confirmation to the standing flight attendant; in several embodiments, the display unit 185d of the seatback tray 150 (shown in FIG. 1D) displays information that is the same as, or at least similar to, the information displayed on the display unit 185a, the display unit 185b, the display unit 185c, the additional display unit opposite the display unit 185c, or any combination thereof, thereby providing visual confirmation to the airline passenger of the successful retailing of the retail item 265 to the airline passenger. In several embodiments, the display unit 185d displays information that is the same as, or at least similar to, the information displayed on the display unit 185a, the display unit 185b, the display unit 185c, the additional display unit opposite the display unit 185c, or any combination thereof, in response to communication from the digital reader device 115a, 115b, 115c, or 115d to the display unit 185d via the network 120, the physical passenger identifier 305, the computer server 110, or any combination thereof.

In several embodiments, the operation of the system 300, or the execution of the method 310, occurs before, during or after the airplane 105 has traveled from a departure location to an arrival location, thereby completing a travel leg or airline flight. In several embodiments, the operation of the system 300 or the execution of the method 310 optimizes the sales process and improves the airline passenger experience by, among other things, significantly improving flight service efficiency, giving airline passengers new and flexible payment form(s) (e.g., via the physical passenger identifier 305), lowering transaction costs, eliminating the need for current OSR device(s) and associated costs, eliminating the time spent by flight attendant(s) entering each sales item into an OSR via touch, pen, and/or keyboard interface, and eliminating the possibility of user errors that might otherwise occur during the OSR item recording process.

Figure 4A:
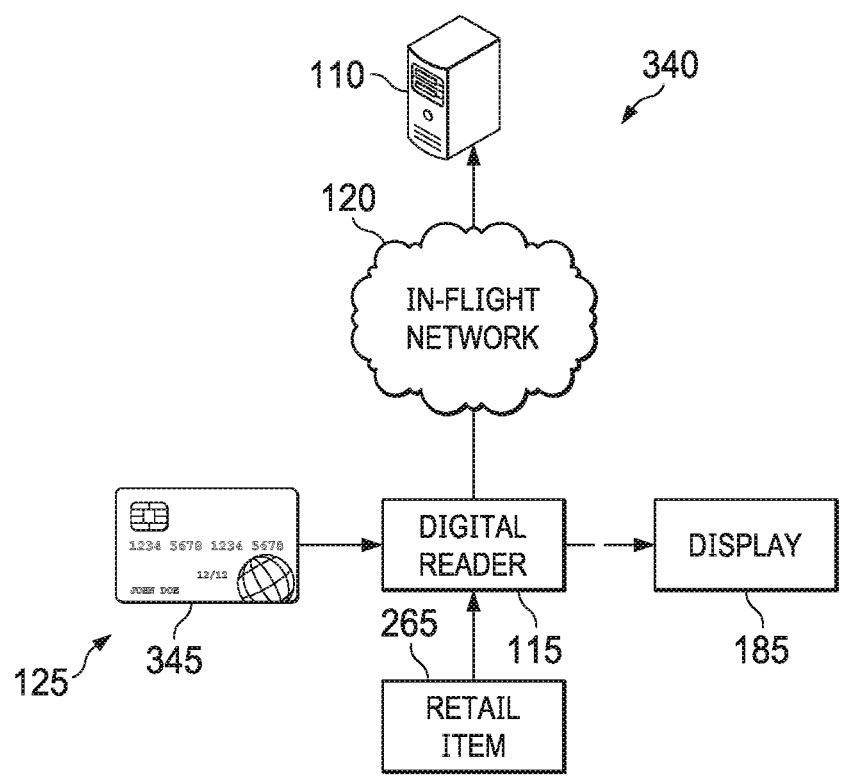
FIG. 4A is a diagrammatic illustration of a system according to one or more embodiments of the present disclosure.

In an embodiment, as illustrated in FIG. 4A, a system is generally referred to by the reference numeral 340 and includes the components of the system 100, which components are given the same reference numerals. Although not shown in FIG. 4A, the system 340 includes the airplane 105, in which the remainder of the components of the system 340 are located or positioned either permanently or temporarily. In the embodiment shown in FIG. 4A, the digital payment object 125 is in the form of a contactless payment object 345 (e.g., an airline passenger's credit/debit card). The digital reader device 115 is adapted to communicate with the contactless payment object 345, as well as the retail item 265 that includes the item identifier 270 (shown in FIG. 2C). The digital reader device 115 is also operably coupled to, and in communication with, the computer server 110 via the in-flight network 120. As described above, the digital reader device 115 may also be operably coupled to, and in communication with, the display unit 185.

Figure 4B:
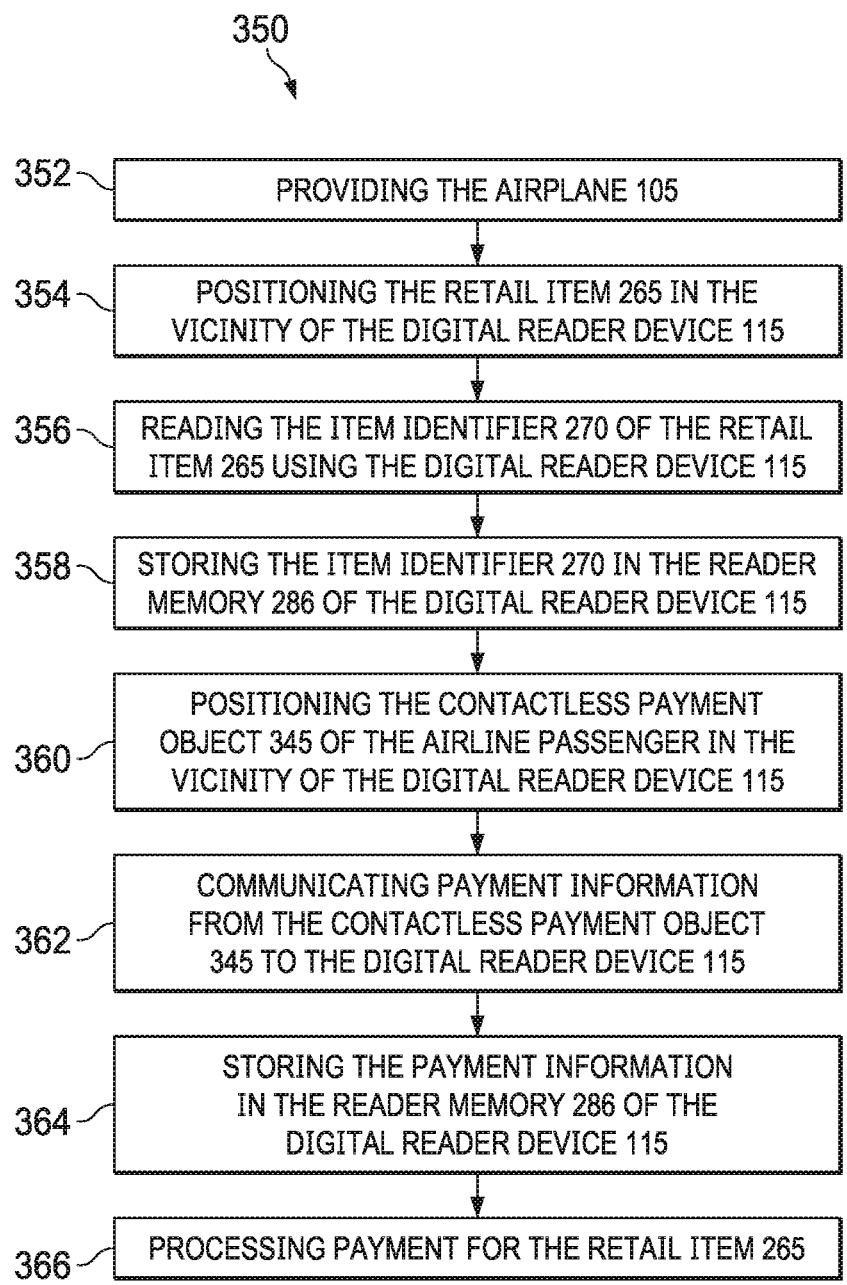
FIG. 4B is a flow chart illustration of a method of operating the system of FIG. 4A, according to one or more embodiments of the present disclosure.

In an embodiment, as illustrated in FIG. 4B with continuing reference to FIG. 4A, a method of operating the system 340 to sell or retail the retail item 265 to an airline passenger and to optimize an inflight sales and payment process is generally referred to by the reference numeral 350. The method 350 is carried out in response to an airline passenger's desire to purchase the retail item 265. The method 350 includes at step 352 providing the airplane 105 equipped with: the airplane cabin 130; the plurality of seats 135 disposed within the airplane cabin 130 and partitioned by the aisle 145; the service cart 160 movable along the aisle 145; and the digital reader device 115 incorporated into either the airplane cabin 130, the service cart 160, or one of the plurality of seats 135. At step 354 the retail item 265 is positioned in the vicinity of the digital reader device 115. In several embodiments, a flight attendant positions the retail item 265 in the vicinity of the digital reader device 115. At step 356 the item identifier 270 of the retail item 265 is read using the digital reader device 115. At step 358 the item identifier 270 is stored in the reader memory 286 (shown in FIG. 2E) of the digital reader device 115. As described above, in several embodiments, the digital reader device 115 incorporates the accumulator 288 (shown in FIG. 2E), which is configured to add the price of the retail item 265 to price(s) associated with any previously read item identifiers (e.g., corresponding to other retail items).

At step 360 the digital payment object 125 is positioned in the vicinity of the digital reader device 115, wherein the digital payment object 125 is carried onto the airplane 105 by the airline passenger, and wherein the digital payment object 125 includes the contactless payment object 345 of the airline passenger. In several embodiments, the airline passenger positions the contactless payment object 345 in the vicinity of the digital reader device 115. In several embodiments, the contactless payment object 345 of the airline passenger is a credit or debit card. At step 362 payment information is communicated from the contactless payment object 345 to the digital reader device 115. At step 364 the payment information is stored in the reader memory 286 of the digital reader device 115.

At step 366 payment is processed for the retail item 265. In several embodiments, the airplane 105 is further equipped with the computer server 110 and the in-flight network 120; and processing payment for the retail item 265 at the step 366 includes: retrieving the item identifier 270 and the payment information from the reader memory 286 of the digital reader device 115; communicating information associated with the item identifier 270 and the payment information from the digital reader device 115 to the computer server 110 via the in-flight network 120; and completing payment processing on the computer server 110 using the payment information communicated to the computer server 110 via the in-flight network 120. In several embodiments, processing of the payment transaction at the step 366 includes displaying order details on the display unit 185 coupled to, and in communication with, the digital reader device 115. In several embodiments, the digital reader device 115 acts as a point-of-sale (POS) device that reads the payment information from the contactless payment object 345 and processes the payment transaction. The processing of the payment transaction may occur online or offline.

In several embodiments, referring back to FIG. 1D with continuing reference to FIGS. 4A-4B, to execute the method 350, at the step 354 the retail item 265 is placed either on or near the topside 205a of the body 195 of the seatback tray 150; the retail item 265 is so placed by either the flight attendant or the airline passenger sitting in the seat associated with the seatback tray 150. At the step 356 the item identifier 270 is read using the digital reader device 115e secured within the recess 210 by the cover plate 215. At the step 360 the airline passenger positions his or her contactless payment object 345, such as a credit/debit card, in the vicinity of the digital reader device 115e, and at step 362 payment information is communicated from the contactless payment object 345 to the digital reader device 115e. In several embodiments, the display unit 185*d* displays information confirming that the step 354, the step 356, the step 360, the step 362, the step 366, or any combination thereof, has or have been completed, thereby providing visual confirmation to the airline passenger and the flight attendant of the successful retailing of the retail item 265 to the airline passenger; in several embodiments, the display unit 185*a* (shown in FIG. 1C) of the service cart 160, the display unit 185*b* (shown in FIG. 1C) of the service cart 160, the display unit 185*c* (shown in FIG. 1C) of the service cart 160, the additional display unit of the service cart 160 opposite the display unit 185*c*, or any combination thereof, display(s) information that is the same as, or at least similar to, the information displayed on the display unit 185*d* of the seatback tray 150, thereby providing visual confirmation to the airline passenger (e.g., via the display unit 185*c*) and the flight attendant (e.g., via the display unit 185*a* or 185*b*) of the successful retailing of the retail item 265 to the airline passenger. In several embodiments, the display unit 185*a*, the display unit 185*b*, the display unit 185*c*, the additional display unit opposite the display unit 185*c*, or any combination thereof, display(s) information that is the same as, or at least similar to, the information displayed on the display unit 185*d* of the seatback tray 150 in response to communication(s) from the digital reader device 115*e* to the display unit 185*a*, the display unit 185*b*, the display unit 185*c*, the additional display unit opposite the display unit 185*c*, or any combination thereof, via the network 120, the contactless payment object 345, the computer server 110, or any combination thereof.

In several embodiments, referring back to FIG. 1C with continuing reference to FIGS. 4A-4B, to execute the method 350, at the step 354 the retail item 265 is placed either on or near the top portion 170*c* of the service cart 160 in the vicinity of the digital reader device 115*a*, 115*b*, 115*c*, or 115*d*; the retail item 265 is so placed by either the flight attendant or the airline passenger. At the step 356 the item identifier 270 is read using the digital reader device 115*a*, 115*b*, 115*c*, or 115*d*. At the step 360 either the airline passenger or the flight attendant positions the airline passenger's contactless payment object 345, such as a credit/debit card, in the vicinity of the digital reader device 115*a*, 115*b*, 115*c*, or 115*d*, and at step 362 payment information is communicated from the contactless payment object 345 to the digital reader device 115*a*, 115*b*, 115*c*, or 115*d*. In several embodiments, the display unit 185*a*, the display unit 185*b*, the display unit 185*c*, the additional display unit opposite the display unit 185*c*, or any combination thereof, displays information confirming that the step 354, the step 356, the step 360, the step 362, the step 366, or any combination thereof, has or have been completed, thereby providing visual confirmation to the airline passenger and the flight attendant of the successful retailing of the retail item 265 to the airline passenger—in one embodiment, such a display of information on the display unit 185*c* (or the additional display unit opposite the display unit 185*c*) provides visual confirmation to the seated airline passenger, and such a display of information on the display unit 185*a* or 185*b* provides visual confirmation to the standing flight attendant; in several embodiments, the display unit 185*d* of the seatback tray 150 (shown in FIG. 1D) displays information that is the same as, or at least similar to, the information displayed on the display unit 185*a*, the display unit 185*b*, the display unit 185*c*, the additional display unit opposite the display unit 185*c*, or any combination thereof, thereby providing visual confirmation to the airline passenger of the successful retailing of the retail item 265 to the airline passenger. In several embodiments, the display unit 185*d* displays information that is the same as, or at least similar to, the information displayed on the display unit 185*a*, the display unit 185*b*, the display unit 185*c*, the additional display unit opposite the display unit 185*c*, or any combination thereof, in response to communication from the digital reader device 115*a*, 115*b*, 115*c*, or 115*d* to the display unit 185*d* via the network 120, the contactless payment object 345, the computer server 110, or any combination thereof.

In several embodiments, the operation of the system 340, or the execution of the method 350, occurs before, during or after the airplane 105 has traveled from a departure location to an arrival location, thereby completing a travel leg or airline flight. In several embodiments, the operation of the system 340 or the execution of the method 350 optimizes the sales process and improves the airline passenger experience by, among other things, significantly improving flight service efficiency, giving airline passengers new and flexible payment form(s) (e.g., via the contactless payment object 345), lowering transaction costs, eliminating the need for current OSR device(s) and associated costs, eliminating the time spent by flight attendant(s) entering each sales item into an OSR via touch, pen, and/or keyboard interface, and eliminating the possibility of user errors that might otherwise occur during the OSR item recording process.

Figure 5:
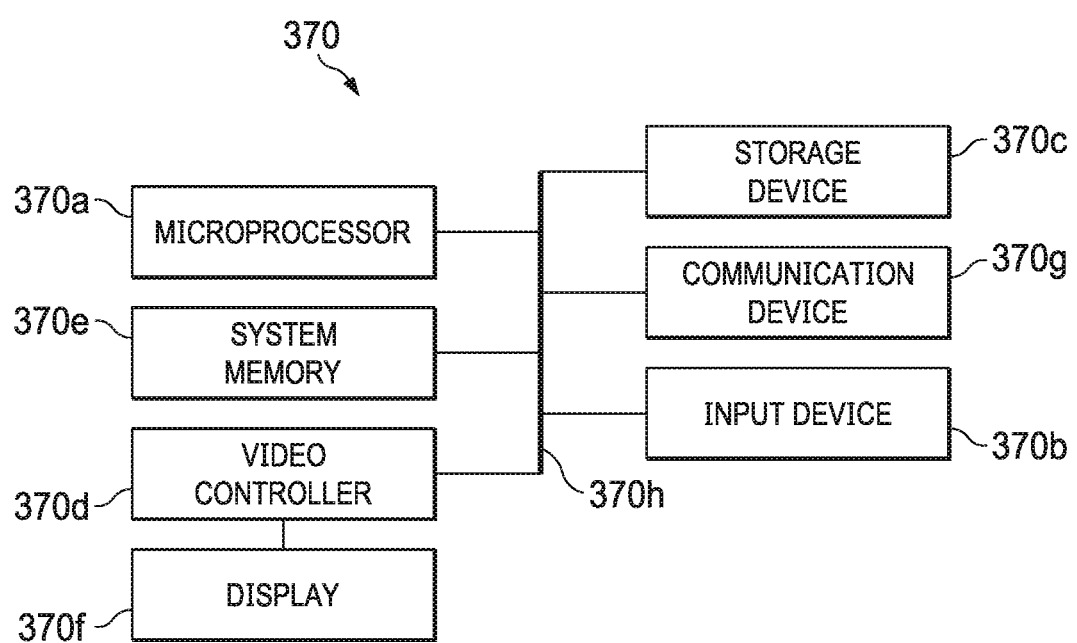
FIG. 5 is a diagrammatic illustration of a node for implementing one or more embodiments of the present disclosure, according to one or more embodiments of the present disclosure.

In an embodiment, as illustrated in FIG. 5, an illustrative node 370 for implementing one or more embodiments of one or more of the above-described networks (e.g., 120), elements, systems (e.g., 100, 240, 300, and/or 340), methods (e.g., 275, 310, and/or 350) and/or steps (e.g., 278, 281, 284, 287, 290, 293, 296, 299, 315, 318, 321, 324, 327, 330, 333, 336, 352, 354, 356, 358, 360, 362, 364, and/or 366), and/or any combination thereof, is depicted. The node 370 includes a microprocessor 370*a*, an input device 370*b*, a storage device 370*c*, a video controller 370*d*, a system memory 370*e*, a display 370*f*, and a communication device 370*g* all interconnected by one or more buses 370*h*. In several embodiments, the storage device 370*c* may include a floppy drive, hard drive, CD-ROM, optical drive, any other form of storage device and/or any combination thereof. In several embodiments, the storage device 370*c* may include, and/or be capable of receiving, a floppy disk, CD-ROM, DVD-ROM, or any other form of computer-readable medium that may contain executable instructions. In several embodiments, the communication device 370*g* may include a modem, network card, or any other device to enable the node to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 370 and/or components thereof, and/or one or more nodes that are substantially similar to the node 370 and/or components thereof. In several embodiments, one or more of the above-described components of the node 370 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD-ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described systems, methods, and/or any combination thereof. In several embodiments, such a processor may include one or more of the microprocessor $370a$, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method of retailing a retail item to an airline passenger has been disclosed. The method generally includes providing an airplane equipped with: an airplane cabin; a plurality of seats disposed within the airplane cabin and partitioned by an aisle; a service cart movable along the aisle; and a digital reader device incorporated into the airplane cabin, the service cart, or one of the plurality of seats; positioning the retail item in the vicinity of the digital reader device; reading an item identifier of the retail item using the digital reader device; storing the item identifier in a reader memory of the digital reader device; positioning a digital payment object in the vicinity of the digital reader device, wherein the digital payment object is carried onto the airplane by the airline passenger, and wherein the digital payment object includes a physical passenger identifier of the airline passenger; communicating airline passenger identification information from the physical passenger identifier to the digital reader device; storing the passenger identification information in the reader memory of the digital reader device; and processing payment for the retail item.

In other embodiments, the method may generally include providing an airplane equipped with: an airplane cabin; a plurality of seats disposed within the airplane cabin and partitioned by an aisle; a service cart movable along the aisle; and a digital reader device incorporated into the airplane cabin, the service cart, or one of the plurality of seats; positioning the retail item in the vicinity of the digital reader device; reading an item identifier of the retail item using the digital reader device; storing the item identifier in a reader memory of the digital reader device; positioning a digital payment object in the vicinity of the digital reader device, wherein the digital payment object is carried onto the airplane by the airline passenger, and wherein the digital payment object includes a contactless payment object of the airline passenger; communicating payment information from the contactless payment object to the digital reader device; storing the payment information in the reader memory of the digital reader device; and processing payment for the retail item.

In still other embodiments, the method may generally include providing an airplane equipped with: an airplane cabin; a plurality of seats disposed within the airplane cabin and partitioned by an aisle; a service cart movable along the aisle; and a digital reader device incorporated into the airplane cabin, the service cart, or one of the plurality of seats; positioning the retail item in the vicinity of the digital reader device; reading an item identifier of the retail item using the digital reader device; storing the item identifier in a reader memory of the digital reader device; positioning a digital payment object in the vicinity of the digital reader device, wherein the digital payment object is carried onto the airplane by the airline passenger, and wherein the digital payment object includes a portable user device of the airline passenger; communicating information associated with the item identifier from the digital reader device to the portable user device; storing the information associated with the item identifier on a computer readable medium of the portable user device; and processing payment for the retail item.

All of the foregoing method embodiments may include one or more of the following elements, either alone or in combination with one another:

- The airplane is further equipped with a network; and processing payment for the retail item includes: retrieving the item identifier and the airline passenger identification information from the reader memory of the digital reader device; communicating information associated with the item identifier and the airline passenger identification information from the digital reader device to a computer server via the network; and completing payment processing on the computer server by: using payment information on file with the airline passenger in the computer server; or electronically invoicing the airline passenger.
- The physical passenger identifier is a boarding pass of the airline passenger having a passive chip incorporated therein.
- The airplane is further equipped with a network; and processing payment for the retail item includes: retrieving the item identifier and the payment information from the reader memory of the digital reader device; communicating information associated with the item identifier and the payment information from the digital reader device to a computer server via the network; and completing payment processing on the computer server using the payment information communicated to the computer server via the network.
- The contactless payment object of the airline passenger is a credit or debit card.
- Processing payment for the retail item includes: retrieving the information associated with the item identifier from the computer readable medium of the portable user device; and completing payment processing on a mobile application of the portable user device by: using payment information on file with the airline passenger in the mobile application; or electronically invoicing the airline passenger.
- The digital reader device is incorporated into the one of the plurality of seats; and the one of the plurality of seats includes a seatback tray having a body into which is formed a recess in which the digital reader device extends.
- Processing payment for the retail item includes: retrieving the item identifier from the reader memory of the digital reader device; and communicating information associated with the item identifier to a display unit attached to the seatback tray.
- The digital reader device is incorporated into the service cart; and the service cart includes a body having a first side portion, a second side portion, a top portion to which the digital reader device is attached, a bottom portion, and an interior portion.
- Processing payment for the retail item includes: retrieving the item identifier from the reader memory of the digital reader device; and communicating information associated with the item identifier to a display unit attached to: the top portion of the service cart; or the first or second side portion of the service cart.

A system adapted to retail a retail item to an airline passenger has also been disclosed. The system generally includes an airplane equipped with: an airplane cabin; a plurality of seats disposed within the airplane cabin and partitioned by an aisle; a service cart movable along the aisle; and a digital reader device having a reader memory, wherein the digital reader device is incorporated into either the airplane cabin, the service cart, or one of the plurality of seats, wherein the retail item has an item identifier and is positionable in the vicinity of the digital reader device, and wherein the item identifier is: readable by the digital reader device when the retail item is positioned in the vicinity of the digital reader device, and storable in the reader memory of the digital reader device after the item identifier has been read by the digital reader device; and a digital payment object positionable in the vicinity of the digital reader device, wherein the digital payment object is adapted to be carried onto the airplane by the airline passenger, wherein the digital payment object includes a physical passenger identifier of the airline passenger, wherein airline passenger identification information is adapted to be communicated from the physical passenger identifier to the digital reader device when the digital payment object is positioned in the vicinity of the digital reader device, and wherein the passenger identification information is storable in the reader memory of the digital reader device.

In other embodiments, the system may generally include an airplane equipped with: an airplane cabin; a plurality of seats disposed within the airplane cabin and partitioned by an aisle; a service cart movable along the aisle; and a digital reader device having a reader memory, wherein the digital reader device is incorporated into either the airplane cabin, the service cart, or one of the plurality of seats, wherein the retail item has an item identifier and is positionable in the vicinity of the digital reader device, and wherein the item identifier is: readable by the digital reader device when the retail item is positioned in the vicinity of the digital reader device, and storable in the reader memory of the digital reader device after the item identifier has been read by the digital reader device; and a digital payment object positionable in the vicinity of the digital reader device, wherein the digital payment object is adapted to be carried onto the airplane by the airline passenger, wherein the digital payment object includes a contactless payment object of the airline passenger, wherein payment information is adapted to be communicated from the contactless payment object to the digital reader device when the digital payment object is positioned in the vicinity of the digital reader device, and wherein the payment information is storable in the reader memory of the digital reader device.

In still other embodiments, the system may generally include an airplane equipped with: an airplane cabin; a plurality of seats disposed within the airplane cabin and partitioned by an aisle; a service cart movable along the aisle; and a digital reader device having a reader memory, wherein the digital reader device is incorporated into either the airplane cabin, the service cart, or one of the plurality of seats, wherein the retail item has an item identifier and is positionable in the vicinity of the digital reader device, and wherein the item identifier is: readable by the digital reader device when the retail item is positioned in the vicinity of the digital reader device, and storable in the reader memory of the digital reader device after the item identifier has been read by the digital reader device; and a digital payment object positionable in the vicinity of the digital reader device, wherein the digital payment object is adapted to be carried onto the airplane by the airline passenger, wherein the digital payment object includes a portable user device of the airline passenger, wherein information associated with the item identifier is adapted to be communicated from the digital reader device to the portable user device when the digital payment object is positioned in the vicinity of the digital reader device, and wherein the information associated with the item identifier is storable on a computer readable medium of the portable user device.

All of the foregoing system embodiments may include one or more of the following elements, either alone or in combination with one another:

- The airplane is further equipped with a network; information associated with the item identifier and the airline passenger identification information is communicable from the digital reader device to a computer server via the network; and the computer server is adapted to complete payment processing upon receipt of the information associated with the item identifier and the airline passenger identification information from the digital reader device by: using payment information on file with the airline passenger in the computer server; or electronically invoicing the airline passenger.
- The physical passenger identifier is a boarding pass of the airline passenger having a passive chip incorporated therein.
- The airplane is further equipped with a network; information associated with the item identifier and the payment information is communicable from the digital reader device to a computer server via the network; and the computer server is adapted to complete payment processing using the payment information communicated to the computer server via the network.
- The contactless payment object of the airline passenger is a credit or debit card.
- A mobile application of the portable user device is adapted to complete payment processing by: using payment information on file with the airline passenger in the mobile application; or electronically invoicing the airline passenger.
- The digital reader device is incorporated into the one of the plurality of seats; and the one of the plurality of seats includes a seatback tray having a body into which is formed a recess in which the digital reader device extends.
- A display unit is attached to the seatback tray; and, to process payment for the retail item: the item identifier is retrievable from the reader memory of the digital reader device; and information associated with the item identifier is communicable to the display unit attached to the seatback tray.
- The digital reader device is incorporated into the service cart; and the service cart includes a body having a first side portion, a second side portion, a top portion to which the digital reader device is attached, a bottom portion, and an interior portion.
- A display unit is attached to either the top portion of the service cart; or the first or second side portion of the service cart; and, to process payment for the retail item: the item identifier is retrievable from the reader memory of the digital reader device; and information associated with the item identifier is communicable to the display unit.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an embodiment, aspects of the present disclosure are readily applicable and/or readily adaptable to a shipping travel leg in which a ship travels from one port to one or more other ports. In an embodiment, aspects of the present disclosure are readily applicable and/or readily adaptable to a trucking travel leg during which a truck travels from one city to one or more other cities. In an embodiment, aspects of the present disclosure are readily applicable and/or readily adaptable to a rail travel leg during which a train travels from one city or station to one or more other cities or stations. In an embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several embodiments, the elements and teachings of the various illustrative embodiments may be combined in whole or in part in some or all of the illustrative embodiments. In addition, one or more of the elements and teachings of the various illustrative embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are examples only and are not limiting, and those skilled in the art will readily appreciate that many other modifications, changes and/or substitutions are possible in the embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method of retailing a retail item in a vehicle, the vehicle comprising a first seat that is part of a first row of seats, a second row of seats positioned directly behind the first row of seats such that a second seat is positioned directly behind the first seat, and an aisle adjacent the second row of seats; wherein the method comprises:
- reading an item identifier of the retail item using a digital reader device accommodated in a seatback of the first seat, the second seat positioned directly behind the first seat, or a service cart movable along the aisle,
  - wherein reading the item identifier of the retail item using the digital reader device comprises:
    - positioning the retail item in the vicinity of the digital reader device; and
    - communicating the item identifier between the retail item positioned in the vicinity of the digital reader device and the digital reader device;
- storing the communicated item identifier in a reader memory of the digital reader device;
- communicating information between a digital payment object of a passenger seated in the second seat and the digital reader device,
  - wherein the digital payment object comprises a portable user device of the passenger seated in the second seat; and
  - wherein communicating the information between the digital payment object of the passenger seated in the second seat and the digital reader device comprises:
    - positioning the portable user device of the passenger seated in the second seat in the vicinity of the digital reader device;
    - retrieving the stored item identifier from the reader memory of the digital reader device; and
    - communicating information associated with the retrieved item identifier to the portable user device of the passenger seated in the second seat;
- storing the communicated information associated with the item identifier on a computer readable medium of the portable user device;
- processing payment for the retail item,
  - wherein the vehicle is equipped with a network,
  - wherein processing payment for the retail item comprises:
    - retrieving the stored information associated with the item identifier from the computer readable medium of the portable user device;
    - communicating payment information on file with the passenger via the network; and
    - completing payment processing on a mobile application of the portable user device using the payment information on file with the passenger,
  - and
  - wherein the payment information on file with the passenger comprises the passenger's loyalty account information;
- communicating information associated with the completed payment to a display unit; and
- displaying, to the passenger sitting in the second seat, the information associated with the completed payment on the display unit.

2. The method of claim 1,
wherein the vehicle is an airplane;
wherein the first row of seats and the second row of seats are disposed within an airplane cabin of the airplane; and
wherein the passenger sitting in the second seat is an airline passenger.

3. The method of claim 1, wherein the payment information on file with the passenger in the mobile application further comprises any one or more of credit card payment information, debit card payment information, and cryptocurrency information.

4. The method of claim 1, wherein the vehicle further comprises the service cart movable along the aisle.

5. The method of claim 1, wherein the vehicle is further equipped with a computer server.

* * * * *